United States Patent
Chusseau et al.

(10) Patent No.: US 12,306,516 B1
(45) Date of Patent: May 20, 2025

(54) DETECTION OF CAMERA LENS COVER POSITION BY BACKLIGHTING

(71) Applicant: SAGEMCOM BROADBAND SAS, Bois-Colombes (FR)

(72) Inventors: Hugo Chusseau, Bois-Colombes (FR); Radu Nedelcu, Bois-Colombes (FR); Alexandre Marton, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 18/990,928

(22) Filed: Dec. 20, 2024

(30) Foreign Application Priority Data

Dec. 21, 2023 (FR) ........................................ 2314934

(51) Int. Cl.
*G03B 17/18* (2021.01)
*G03B 11/04* (2021.01)
*G03B 30/00* (2021.01)
*H04N 21/4223* (2011.01)

(52) U.S. Cl.
CPC ............ *G03B 17/18* (2013.01); *G03B 11/043* (2013.01); *G03B 30/00* (2021.01); *H04N 21/4223* (2013.01)

(58) Field of Classification Search
CPC ...... G03B 11/043; G03B 30/00; G03B 17/18; H04N 21/4223
See application file for complete search history.

(56) References Cited

U.S. PATENT DOCUMENTS

| | | | | |
|---|---|---|---|---|
| 8,444,331 B2* | 5/2013 | Kobayashi | ............. | H04N 23/55 257/433 |
| 11,178,319 B2* | 11/2021 | Li | ........................ | H04N 23/57 |
| 11,294,260 B2* | 4/2022 | Park | ....................... | G06F 1/1686 |
| 11,619,862 B2* | 4/2023 | Wu | ........................ | G03B 7/01 396/452 |
| 11,714,331 B2 | 8/2023 | Wallace | | |
| 2010/0309369 A1 | 12/2010 | Jarvis et al. | | |
| 2013/0088639 A1 | 4/2013 | Mundt et al. | | |
| 2013/0242479 A1* | 9/2013 | Yoo | ....................... | G01J 1/0455 361/679.01 |
| 2014/0333831 A1* | 11/2014 | Oh | ........................ | H04M 1/185 348/376 |
| 2019/0033686 A1 | 1/2019 | Kinoshita et al. | | |

* cited by examiner

*Primary Examiner* — Clayton E. LaBalle
*Assistant Examiner* — Diana Hancock
(74) *Attorney, Agent, or Firm* — MUNCY, GEISSLER, OLDS & LOWE, P.C.

(57) ABSTRACT

An electronic apparatus having: a casing; an image capture device; a movable shutter movably mounted in such a way that when the movable shutter is in a working position, the image capture device sees the exterior of the casing, and when the shutter is in a rest position, the movable shutter blocks the exterior of the casing for the image capture device; and a light source. The movable shutter has an optical device such that when the movable shutter is in its rest position, the optical device is arranged to guide the light from the light source to the image capture device.

10 Claims, 4 Drawing Sheets

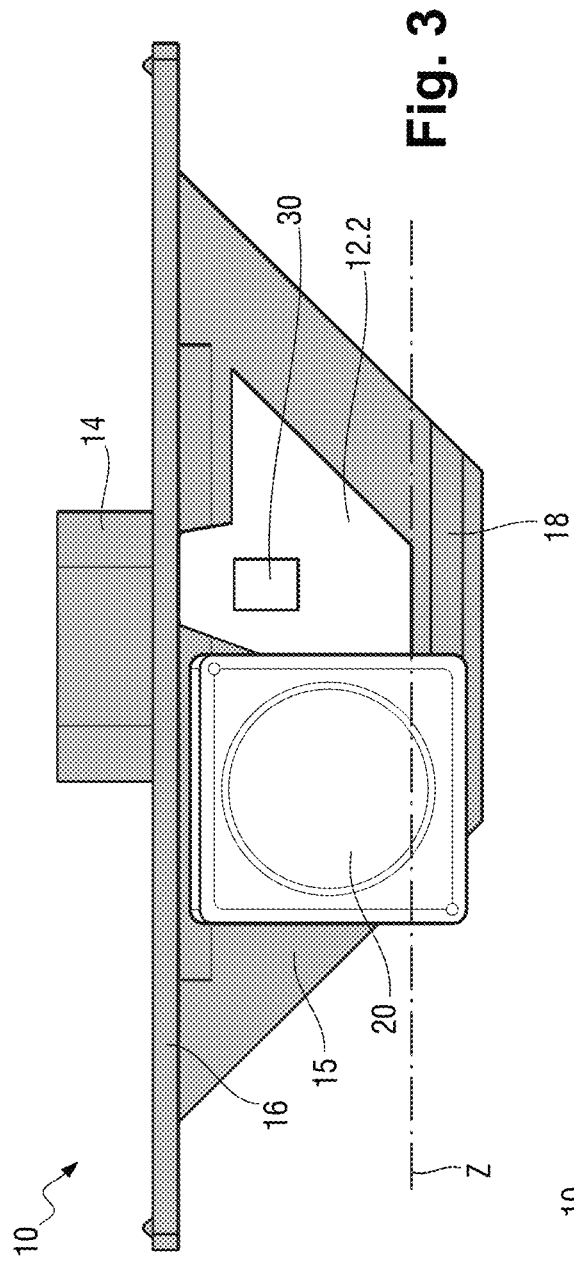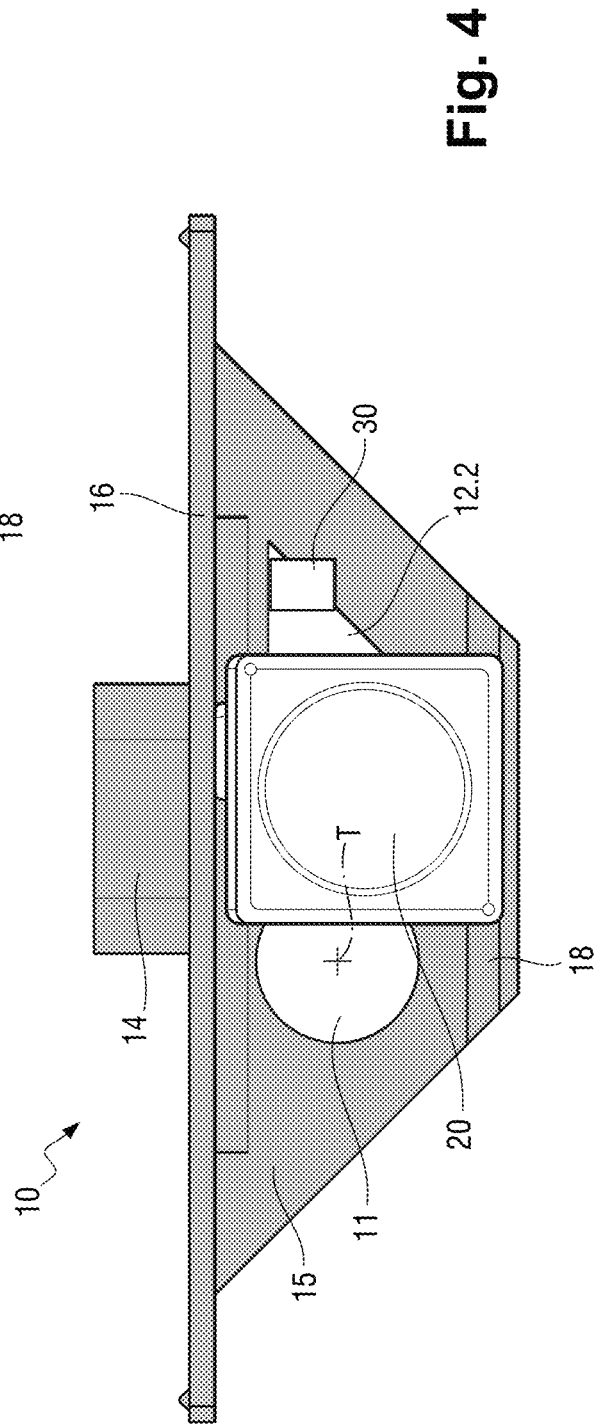

DETECTION OF CAMERA LENS COVER POSITION BY BACKLIGHTING

The present invention relates to the field of The present electronic apparatuses that include an image capture device.

BACKGROUND OF THE INVENTION

It is known from the prior art that electronic apparatuses such as set-top boxes can include a camera allowing users to make video calls.

Usually, an LED is arranged close to the camera so that a user can tell if the camera is on or off.

Furthermore, the presence of a cap makes it possible to temporarily block the field of view of the camera, giving the user a more comfortable environment in terms of privacy.

Sometimes, users launch an application that requires use of the camera but forget to remove the cap from the field of view of the camera.

Users may then not realise their mistake for some time, which is not ideal.

OBJECT OF THE INVENTION

The object of the invention is in particular to more easily detect the closed position of a shutter of an image capture device when said device is switched on.

SUMMARY OF THE INVENTION

To this end, according to the invention, an electronic apparatus is proposed, comprising:
 a casing provided with a first opening,
 an image capture device having a field of view,
 a movable shutter provided with an opening, said shutter being mounted on the casing so as to be movable between a working position and a rest position such that when the movable shutter is in its working position, the image capture device can, during operation, see the exterior of the casing via the first opening and the opening in the movable shutter, and when the shutter is in its rest position, the movable shutter blocks the first opening for the image capture device, and
 a light source.

According to the invention, the movable shutter comprises an optical device arranged to guide the light such that when the movable shutter is in its rest position, the optical device is arranged to guide the light from the light source to the field of view of the image capture device.

As a result, if the image capture device is turned on while the lens cover is in the rest position, the image created by the image capture device will not be black owing to the light guided by the optical device being received. Consequently, the electronic apparatus can detect, by means of the image capture device itself, the undesired combination of the image capture device being switched on and the lens cover being in the rest position.

Advantageously, owing to the invention, there is no risk of possible confusion when the image capture device creates a black image; the only explanation for this is that the environment is too dark for said device to function properly, not that the device is creating an image of the lens cover.

Advantageously, the invention does not need to use a dedicated additional sensor to detect the position of the movable shutter.

The terms "top", "bottom", "front", "back", etc. should be understood according to the operating position of the electronic apparatus when it is resting on a planar structure, which is preferably parallel to the horizontal.

In addition, an electronic apparatus as described above is proposed in which the optical device is arranged on the movable shutter so as to extend opposite the image capture device and said light source when the movable shutter is in its rest position.

In addition, an electronic apparatus as described above is proposed in which the optical device of said movable shutter extends as far as the exterior of said casing.

In addition, an electronic apparatus as described above is proposed in which the image capture device and said light source are fastened to an electronic card of the electronic apparatus, wherein the assembly formed by the electronic card, the image capture device and the light source is fixed in place relative to the casing.

In addition, an electronic apparatus as described above is proposed in which the optical device of the movable shutter comprises at least one translucent portion.

In addition, an electronic apparatus as described above is proposed in which the optical device and said movable shutter are formed as a single piece.

In addition, an electronic apparatus as described above is proposed in which said light source is capable of emitting a blinking that is detectable by the image capture device when the movable shutter is in its rest position.

In addition, an electronic apparatus as described above is proposed in which the blinking has a complex sequence.

In addition, an electronic apparatus as described above is proposed in which the optical device of said movable shutter comprises a figure positioned facing the field of view of the image capture device when the movable shutter is in its rest position.

In addition, an electronic apparatus as described above is proposed in which the electronic apparatus is a set-top box.

Other features and advantages of the invention will become clear on reading the following description of a particular and non-limiting embodiment of the invention.

BRIEF DESCRIPTION OF THE DRAWINGS

Reference is made to the accompanying drawings, among which:

FIG. 3 is a view of the part shown in

FIG. 2 from behind, a movable shutter of the electronic apparatus being in its working position;

FIG. 4 is an identical view to that of FIG. 3, the movable shutter being in its rest position;

DETAILED DESCRIPTION OF THE INVENTION

Figure 1:
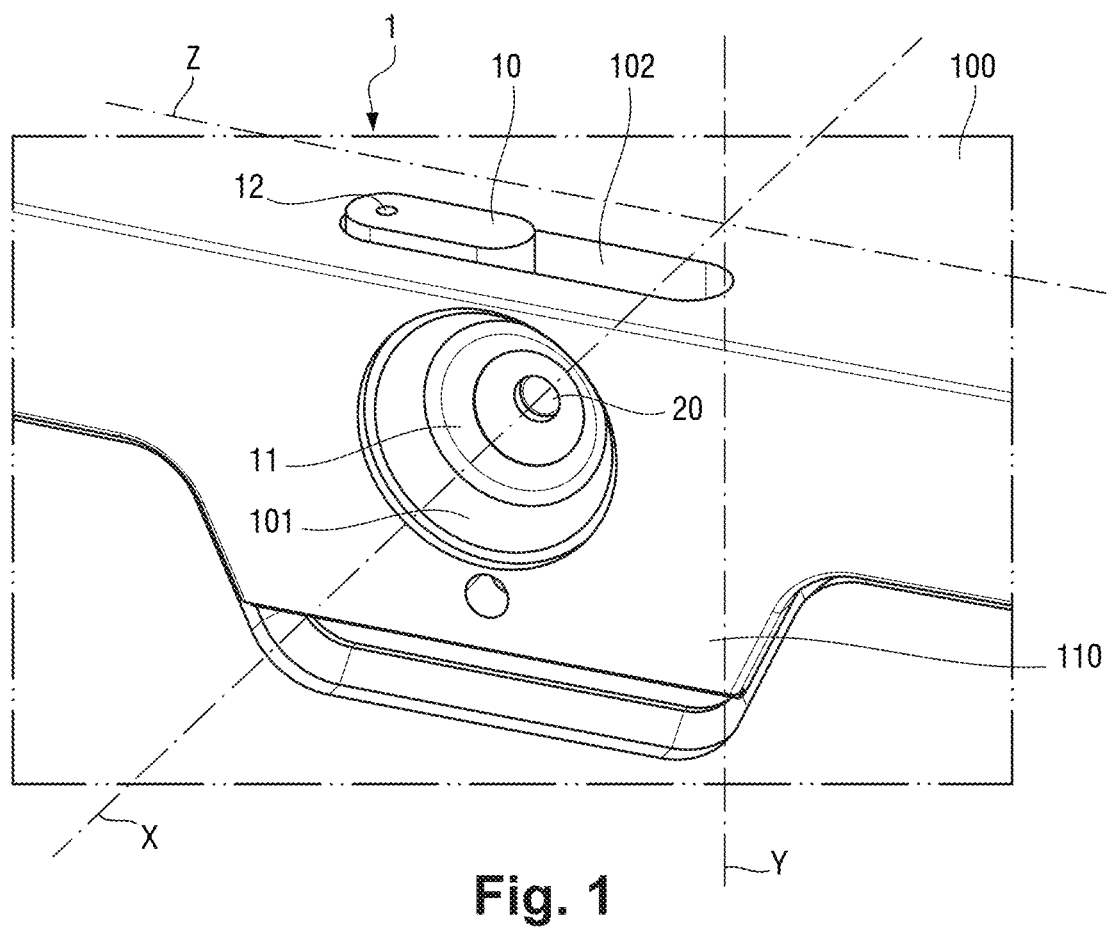
FIG. 1 is a front view of a portion of the electronic apparatus according to a particular embodiment of the invention.
Figure 2:
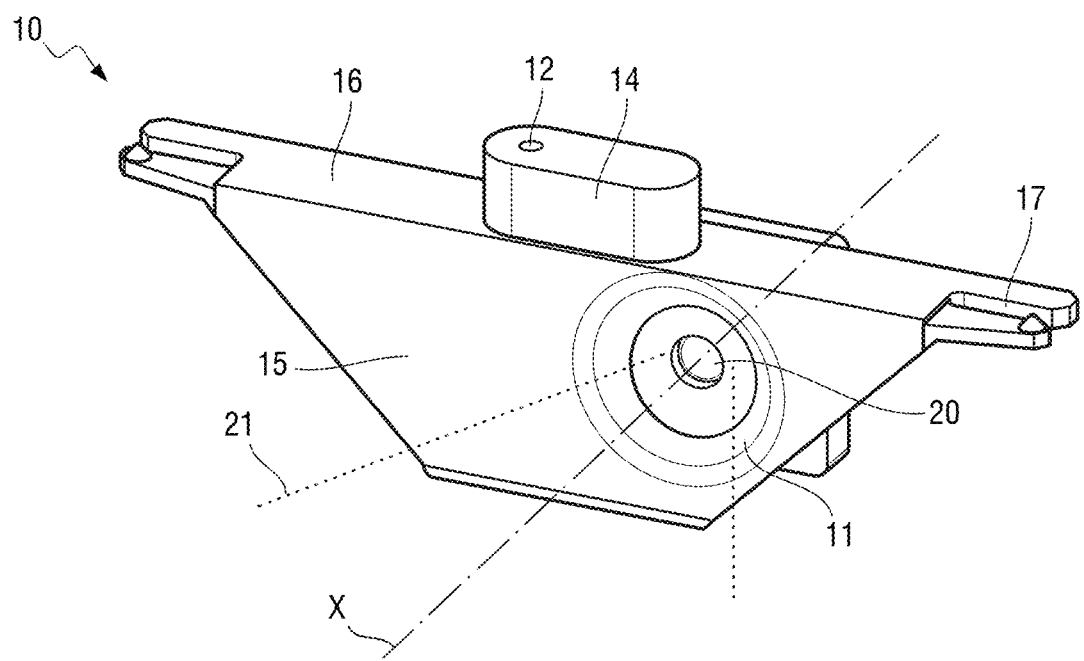
FIG. 2 is a front view of one part of the portion of the electronic apparatus shown in FIG. 1.
Figure 5:
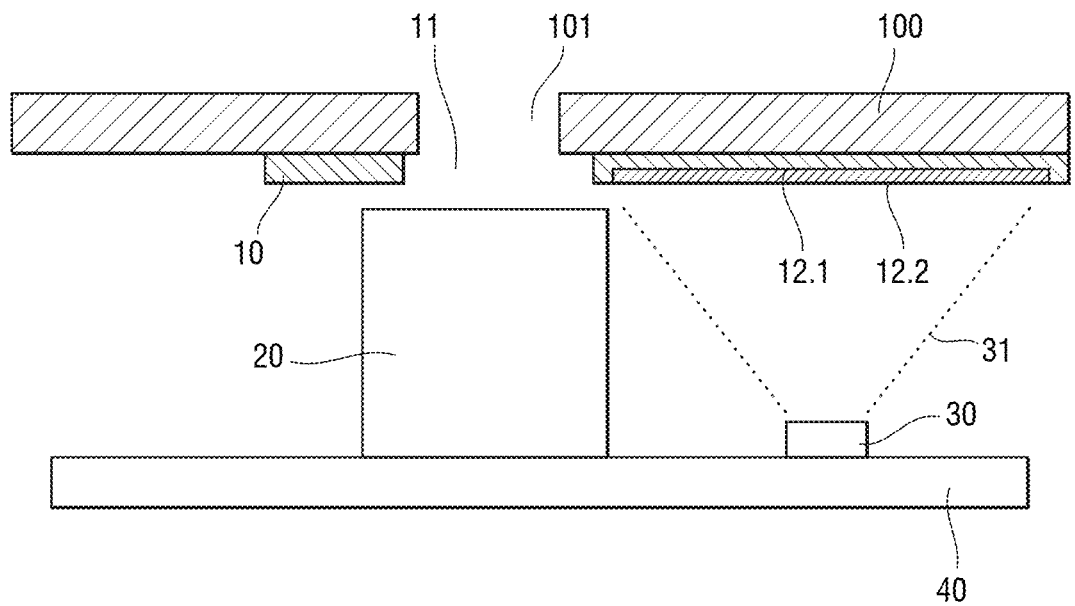
FIG. 5 is a schematic plan view of one part of the electronic apparatus shown in FIG. 1 when said movable shutter is in its working position.
Figure 6:
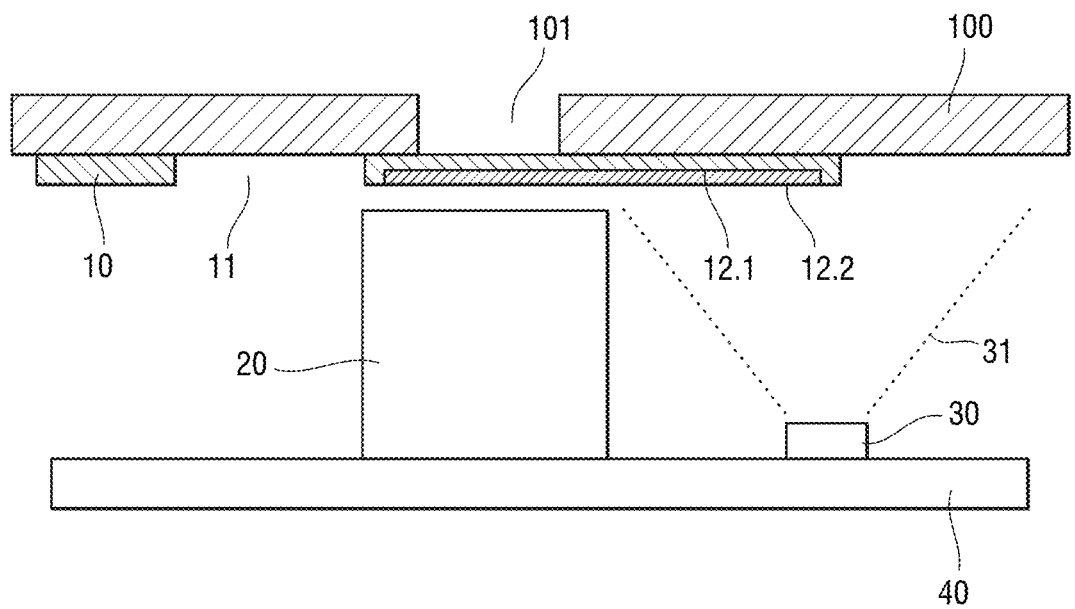
FIG. 6 is an identical view to that of FIG. 5 when the movable shutter is in its rest position.

With reference to FIGS. 1 to 6, an electronic apparatus 1 according to a particular embodiment of the invention is described.

In this case, the electronic apparatus 1 is a set-top box.

The electronic apparatus 1 comprises a casing 100. The casing has a top wall, a bottom wall and at least one side wall interconnecting the top wall and the bottom wall. Preferably, the bottom wall and the top wall are parallel to each other. By way of example, the bottom wall and the top wall are rectangular or square in shape, preferably with rounded edges. For example, four side walls interconnect the top wall and the bottom wall. For example, the side walls extend in parallel with each other in pairs. For example, each of the side walls extends orthogonally to at least one out of the bottom wall and the top wall, preferably to both the bottom and the top wall.

The casing 100 is generally in the shape of a rectangular parallelepiped. The casing 100 preferably has rounded edges, not sharp edges.

The casing 100 is shaped so that when it rests on a support, its bottom wall and its top wall extend in parallel with the support, and its side walls extend orthogonally to the support.

The casing 100 is provided with a first opening 101. Preferably, the first opening 101 is made in a side wall of the casing 100. The first opening 101 thus opens into the interior of the casing 100 at a first end and to the exterior of the casing 100 at a second end. The first opening 101 extends along a first axis X through the side wall of the casing 100. In this case, the first axis X is horizontal when the casing 100 rests on a horizontal planar stand.

By way of example, the first opening 101 has a cross section that narrows as said opening 101 gets closer to the interior of the casing 100. The first opening 101 is thus frustoconical.

The electronic apparatus 1 also comprises an image capture device. By way of example, the image capture device is a camera 20. The camera 20 is positioned inside the casing 100 so that the exterior of the casing can be seen via the first opening 101. Typically, the camera 20 has a field of view 21 that faces the first opening 101 when the camera is switched on. As a result, at least one portion of the field of view of the camera 20 extends through the first opening 101. Typically, the field of view 21 of the camera 20 is centred around at least one viewing axis. Preferably, said viewing axis extends in parallel with the first axis X. The field of view 21 preferably extends coaxially with the first axis X and/or with the first opening 101.

Preferably, the camera 20 is fixedly mounted with respect to the casing 100. The camera 20 is thus fastened to at least one wall of the casing either directly or indirectly. For example, the camera 20 is fastened to at least one wall of the casing by means of at least one electronic card 40.

For example, the camera 20 is fixedly mounted on an electronic card 40 which is itself fixedly mounted on at least one part of the casing 100. The electronic card 40 and the camera are thus fixed in place in the casing 100.

The side wall of the casing 100 in which the first opening 101 is formed thus forms the front wall 110 of the casing 100, i.e. the wall of the casing 100 intended to face the user.

Furthermore, the electronic apparatus 1 comprises a light source 30. By way of example, the light source 30 is a light-emitting diode (LED). The light source 30 is positioned inside the casing 100. Typically, the light source 30 has an illumination field 31 which, when the light source 30 is activated, faces at least one wall of the casing 100. Typically, the illumination field 31 of the light source 30 is centred around at least one illumination axis. Preferably, said illumination axis extends in parallel with the first axis X and/or with the viewing axis of the camera 20. The light source 30 and the camera 20 are thus preferably arranged facing the same wall of the casing 100, one next to the other and pointing in the same direction.

Preferably, the light source 30 is fixedly mounted with respect to the casing 100. The light source 30 is thus fastened to at least one wall of the casing either directly or indirectly. For example, the light source 30 is fastened to at least one wall of the casing by means of at least one electronic card.

For example, the light source 30 is fixedly mounted on an electronic card which is itself fixedly mounted on at least one part of the casing 100. The electronic card and the light source 30 are thus fixed in place in the casing 100.

Preferably, said electronic card is the electronic card 40. The light source 30 and the camera 20 are thus borne by the same support.

Furthermore, the electronic apparatus 1 comprises an optical device 12.

Preferably, the optical device 12 is an optical waveguide. The optical device 12 thus makes it possible to guide the light emitted by the light source 30, as will be described below.

To this end, the optical device 12 is arranged in the casing between the casing wall in which the first opening 101 is made (in this case the front wall 110 of the casing) and the light source 30. The light source 30 is thus capable of illuminating the back of the optical device.

However, one part of the optical device 12 extends as far as the exterior of the casing 100, through at least one second opening 102 in the casing 100.

Preferably, the second opening 102 is made in the top wall of the casing 100. The second opening 102 thus opens into the interior of the casing 100 at a first end and to the exterior of the casing 100 at a second end. The second opening 102 is made in the casing 100 near the first opening 101. For example, the second opening 102 is made vertically in line with the first opening 101. The second opening 102 extends along a second axis Y through the top wall of the casing 100. In this case, the second axis Y is orthogonal to the first axis X. In this case, the second axis Y extends vertically when the casing 100 rests on a horizontal planar stand.

By way of example, the second opening 102 has an oblong cross section. For example, the second opening 102 has a regular cross section over its entire length.

The optical device 12 thus extends in the casing 100 from the light source 30 as far as the exterior of the casing 100 via the second opening 102.

The optical device 12 is in the shape of a planar piece. The optical device 12 thus has a front main face 12.1, arranged facing the wall of the casing 110 in which the first opening 101 is made, and a back main face 12.2 on the opposite side to the front main face 12.1. During operation, the light source 30 thus illuminates the back main face 12.2 of the optical device 12. The thickness of the piece is therefore much less than the dimensions of the two main faces. The optical device 12 is thus arranged so as to extend in parallel with the front wall 110 of the casing 200.

Furthermore, the optical device 12 comprises at least one light-transmitting portion. Said portion is preferably neither transparent nor opaque. Preferably, said portion is milky in colour. Preferably, said portion is translucent.

It should be noted that an object is described as translucent if it lets light pass through but does not allow other objects to be clearly discerned through it, due to multiple anisotropic refractions of the light rays. It is thus different from both a transparent object, which lets light pass through and allows objects to be discerned through it, and an opaque object, which absorbs or reflects the light rays. A translucent object diffuses the light as it is transmitted through that object, making it difficult or impossible to observe anything through it.

For example, the portion has a transmittance of between 40 and 80%, e.g. between 50 and 70%, e.g. 60%.

By way of example, said portion is made of tinted polycarbonate, for example polycarbonate tinted with titanium dioxide.

Preferably, said light-transmitting portion forms the entirety of the piece constituting the optical device 12. Thus, in this example, the entire optical device 12 is translucent.

The electronic apparatus 1 also comprises a movable shutter 10 of the camera 20. The movable shutter 10 is arranged inside the casing 100.

Preferably, the movable shutter 10 is mounted so as to be movable with respect to the casing 100. For example, the movable shutter 10 is mounted in the casing 100 so as to be movable by at least one translational movement, preferably by a single translational movement. For example, the movable shutter 10 is mounted in the casing 100 so as to be movable along a third axis Z, which in this case is orthogonal to the first axis X and to the second axis Y. In this case, the third axis Z extends horizontally when the casing 100 rests on a horizontal planar stand.

The movable shutter 10 comprises a plate extended by a grip tab 14.

By way of example, the plate comprises a base 15 extended at the top by an edging 16.

For example, the base 15 is in the shape of a planar piece. The base 15 thus has a front main face, arranged facing the wall of the casing 110 in which the first opening 101 is made, and a back main face on the opposite side to the front main face. The thickness of the base 15 is therefore much less than the dimensions of the two main faces. The base 15 is thus arranged so as to extend in parallel with the wall of the casing 100 and/or with the optical device 12.

A third opening 11 is made inside the movable shutter 10 and is preferably inside the base 15 in this case. The third opening 11 thus opens into the interior of the casing 100 (on the back main face of the movable shutter 10) at a first end and to the exterior of the casing 100 (on the front main face of the movable shutter 10) at a second end. The third opening 11 extends along a given axis T, which is preferably parallel to the first axis X. By way of example, the third opening 11 has a circular cross section. For example, the third opening 11 has a cross section that narrows towards the interior of the casing 100. The third opening 11 is thus frustoconical.

In this case, the edging 16 overhangs a top end of the base 15. Preferably, the edging 16 extends orthogonally to the base 15.

By way of example, the edging 16 is in the shape of a planar piece. The edging 16 thus has a top main face, arranged facing the top face of the casing, and a bottom main face on the opposite side to the top main face. The thickness of the edging is therefore much less than the dimensions of the two main faces. The edging 16 is thus arranged so as to extend in parallel with the top wall of the casing 100 and/or orthogonally to the front wall 110 of the casing comprising the first opening 101.

The grip tab 14 preferably extends from the edging towards the top wall of the casing. The tab 14 extends rectilinearly from the edging along an axis that is orthogonal to the edging, in particular orthogonal to the top face of the edging.

Preferably, the movable shutter 10 is arranged in the casing such that the grip tab 14 extends through the second opening 102 to protrude from said second opening 102. Thus, users can move the movable shutter relative to the casing 100 with the aid of the grip tab 14.

Preferably, the movable shutter 10 and/or the rest of the electronic apparatus 1 is/are equipped with at least one guide means for moving the shutter in the casing 100. For example, either the movable shutter 10 or the rest of the electronic apparatus is equipped with male guide means, the other being equipped with female guide means for guiding the translation of the movable shutter 10 in the casing 100. For example:

the edging 16 is equipped on its top face with at least one pin capable of interacting with at least one rail (not visible here) provided inside the casing, the rail extending in parallel with the axis Z, and/or the base 15 is equipped on its back face with at least one rail that extends in parallel with the axis Z and is capable of interacting with at least one finger secured to the camera 20.

The grip tab 14 is preferably oblong in shape. The cross section (in a sectional plane normal to the axis Y) of the grip tab is thus oblong in shape.

It is noted that the second opening 102 defines two end positions of the movable shutter 10:

a first end position in which the grip tab 14 abuts one of the longitudinal edges of the second opening 102, referred to as the working position (FIG. 1), a second end position in which the grip tab 14 abuts the other longitudinal edge of the second opening 102, referred to as the rest position (FIG. 4).

Preferably, the shape of the longitudinal edges of the second opening 102 matches that of a corresponding edge of the grip tab 14.

It is also noted that the movable shutter 10 is arranged in the casing 100 between the front wall 110 of the casing 100 and the camera 20.

Furthermore, it is noted that the movable shutter 10 is arranged in the casing 100 between the front wall 110 of the casing 100 and the light source 30.

However, one part of the movable shutter 10 (in this case the grip tab 14) extends as far as the exterior of the casing 100 through the second opening 102 in the casing 100.

In addition, the movable shutter 10 is arranged in the casing such that when the movable shutter is in its working position, its third opening 11 is opposite the first opening 101 in the casing 100. In this position, the first opening 101 and the third opening 11 preferably extend coaxially with each other. As a result, the camera 20 can see the exterior of the casing 100.

In addition, the movable shutter 10 is arranged in the casing such that when the movable shutter is in its rest position, its third opening 11 is offset from the first opening 101 in the casing 100. The field of view of the camera 20 is then blocked by the movable shutter 10, more precisely by the base 15. As a result, the camera 20 cannot see the exterior of the casing 100.

Furthermore, the optical device 12 is borne by the movable shutter 10. The optical device 12 is thus fastened to the movable shutter 10. The optical device 12 is therefore constrained to move in translation with the movable shutter 10.

Preferably, the optical device 12 and the movable shutter 10 form a single piece. For example, the movable shutter 10 is overmoulded on the optical device 12.

The optical device 12 is arranged between the movable shutter 10 and the light source 30. The optical device 12 is thus arranged so that its front main face faces the back main face of the base 15 of the movable shutter 10.

The optical device 12 is furthermore arranged such that a portion of said optical device 12 extends through the grip tab 14 as far as the exterior of the casing 100. For example, the grip tab 14 comprises a fourth opening through which said portion extends. As a result, users can see said portion from outside the casing 100 when they look at the grip tab. The fourth opening extends along a given axis, which is preferably parallel to the second axis Y. The fourth opening thus opens at the top face of the grip tab 14. By way of example, the fourth opening has a circular cross section. For example, the fourth opening has a circular cross section over its entire length.

The optical device 12 is also arranged so as to always have at least one zone facing the light source 30 regardless of the position of the movable shutter 10 relative to the casing. Thus, the position of the movable shutter 10 does not influence the diffusion, by the optical device 12, of the light coming from the light source 30 since the light source 30 is mounted permanently facing the optical device 12.

Furthermore, the optical device 12 is arranged such that when the movable shutter 10 is in its rest position, the camera 20 faces at least one zone of the optical device 12. By contrast, when the movable shutter 10 is in the working position, the optical device 12 does not face the camera 20.

The operation of the electronic apparatus 1 according to a first implementation will now be described below.

When a user wishes to have a video call, they activate the camera 20. At this point, the light source 30 is deactivated.

Consequently, if the camera 20 detects an image other than a black image, the situation is nominal. This means that the user has correctly moved the movable shutter 10 into its working position. The third opening 11 is then aligned with the first opening 101, and the camera 20 can therefore see the exterior of the casing 100 and thus the user. This also means that the ambient lighting is sufficient for the camera 20 to properly create an image of said environment.

A control member of the electronic apparatus 1 (such as a controller, a processor, etc., integrated in the electronic card 40 and/or in the camera 20 and/or in at least one other element of the casing 100) deduces from this that the movable shutter 10 is in its working position and then orders the activation of the light source 30.

Preferably, the light source 30 then emits continuous light signal.

Consequently, the user can check the camera 20 is switched on by means of the portion of the optical device 12 that is accessible via the grip tab 14. The light source 30 illuminates the optical device 12, which diffuses light to the exterior of the casing 100 via the second opening 102.

By contrast, if the camera 20 is on and detects a black image, the situation is degraded. Specifically, where the camera 20 identifies a black image, there are two possible scenarios: either the movable shutter 10 is still in the rest position and is blocking the field of view of the camera 20, or the environment in which the electronic apparatus 1 is placed is particularly dark. Distinguishing between these two cases is particularly important because in the first case, the user has to move the movable shutter 10 to clear the field of view of the camera 20. In the second case, however, no action is required as regards the electronic apparatus 1. Yet the user does have to increase the lighting in their environment.

The optical device 12 allows the light to be guided from the light source 30 to the camera 20. The camera 20 can thus detect this light. The position of the movable shutter 10 is determined on the basis of this principle.

When the camera 20 detects a black image, the control member of the electronic apparatus 1 then orders the light source 30 to emit a discontinuous signal such as blinking.

If this blinking is detected by the camera 20, this means that the camera 20 is facing the optical device 12; the optical device 12 is diffusing the blinking emitted by the light source 30 to the camera 20. The control member deduces from this that the movable shutter 10 is in its rest position.

The control member can then alert the user, for example by means of a sound and/or light signal, that they need to move the movable shutter 10.

Once the user has moved the movable shutter 10 into its working position, the camera 20 is normally no longer able to detect said blinking because it is no longer facing the optical device 12, its field of view now being unobstructed. The control member of the electronic apparatus 1 then forces the light source 30 to emit a continuous light signal in order to restore the nominal situation.

If the blinking is not detected by the camera 20, this means that the camera 20 is not facing the optical device 12 and that its field of view is therefore unobstructed. The control member deduces from this that the movable shutter 10 is in its working position. The control member can then alert the user, for example by means of a sound and/or light signal, that they need to improve the lighting in their environment. Since the movable shutter 10 is in its working position, the control member of the electronic apparatus 1 forces the light source 30 to emit a continuous light signal.

Preferably, the light source 30 emits a complex blinking sequence. The term "complex" means that the blinking emitted by the light source is different from a simple alternation between a flash of light of a predetermined duration and no light for a predetermined length of time that is identical to the duration of the flash of light, i.e. a simple sequence of 0 and 1 if the blinking is correlated with a binary signal.

Preferably, the blinking emitted by the light source 30 is also different from a simple alternation between a flash of light of a predetermined duration and no light for a predetermined length of time that is different from the duration of the flash of light.

Preferably, the blinking sequence emitted by the light source 30 is irregular, having flashes of light of different durations and/or no light for different lengths of time such as, by way of example and in a non-limiting manner, the following sequence:

flash of duration At
no light for a length of time of 2 times At
flash of duration At
no light for a length of time At
flash of a duration of 2 times At
no light for a length of time At Preferably, the blinking sequence emitted by the light source 30 is repeated periodically.

This complex sequence makes it possible to limit any risk of confusion between the desired blinking of said light source 30 with respect to potential secondary blinking coming from another device in the field of view of the camera 20. Otherwise, the control member might deduce from the second scenario that the movable shutter 10 is in the rest position despite this not being the case.

By way of example, the movable shutter 10 determines whether the camera 20 is seeing the blinking of the light source 30.

The blinking can be detected by analysing images, for example, or by analysing the amount of light captured by the optical cells of the camera 20.

In the latter case, the calculation member is based on the value of the maximum amount of light that can be captured by the optical cells of the camera Lm when a flash of light is generated by the light source 30 and transmitted by the optical device 12. By way of example, the maximum amount of light is predetermined (for example using one or more pieces of manufacturer data) and/or estimated during an initialisation phase of the electronic apparatus 1 during at least one qualification test by exposing the camera 20 to at least one very strong light source such as a powerful lamp arranged a short distance from the camera (the value thus estimated can optionally be compared with at least one piece of manufacturer data in order to be corrected accordingly).

During operation, if the amount of light captured is less than 50% of the value of Lm, then the light source 30 is considered not to be emitting light. By contrast, if the amount of light captured is greater than 50% of Lm, then the light source 30 is considered to be emitting a flash.

The control member therefore detects the amount of light captured by the camera 20 over time, enabling it to recognise a complex blinking sequence.

The operation of the electronic apparatus 1 according to a second implementation will now be described below.

In this second implementation, the optical device 12 of said movable shutter 10 comprises a figure (symbol, design, two- or three-dimensional barcode, alphanumeric signs, pattern, imprint or any other representation) positioned at least partly facing the field of view of the camera 20 when the movable shutter 10 is in its rest position.

Figure 7:
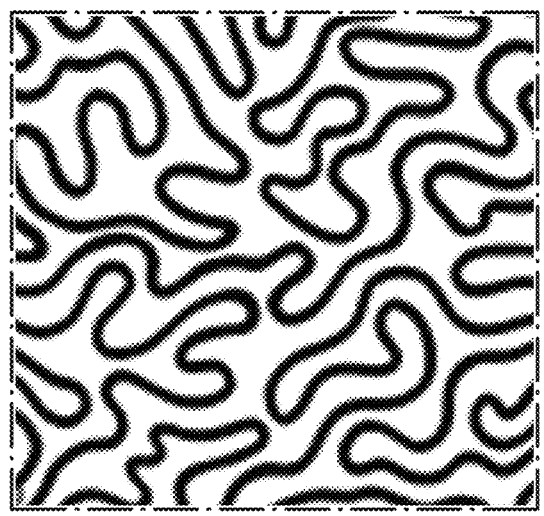
FIG. 7 shows a figure that can be borne by the movable shutter of the electronic apparatus shown in FIG. 1.

To make said figure simple to detect, it preferably has to be abstract and/or not represent any object or person potentially present in the surroundings of the electronic apparatus 1 (chair, pen, face, etc.). FIG. 7 shows a non-limiting example of a figure.

By way of example, the figure is disposed on a transparent label, which in turn is affixed to the optical device 12. For example, the figure is printed, glued, screen-printed, engraved, etc. on said label.

When a user wishes to have a video call, they activate the camera 20. At this point, the light source 30 is deactivated.

Consequently, if the camera 20 detects an image other than a black image, the situation is nominal. This means that the user has correctly moved the movable shutter 10 into its working position. The third opening 11 is then aligned with the first opening 101, and the camera 20 can therefore see the exterior of the casing 100 and thus the user. This also means that the ambient lighting is sufficient for the camera 20 to properly create an image of said environment. Next, the light source 30 is activated following a command given by the control member. Preferably, the light source 30 emits a continuous light signal. Consequently, the user can check the camera 20 is switched on by means of the portion of the optical device 12 that is accessible via the grip tab 14. The light source 30 illuminates the optical device 12, which diffuses light to the exterior of the casing 100 via the second opening 102.

By contrast, if the camera 20 is on and detects a black image, the situation is degraded. Specifically, where the camera 20 identifies a black image, there are two possible scenarios: either the movable shutter 10 is still in the rest position and is blocking the field of view of the camera 20, or the environment in which the electronic apparatus 1 is placed is particularly dark.

When the camera 20 detects a black image, the control member of the electronic apparatus 1 then orders the light source 30 to emit a (continuous or blinking) light signal.

If the camera 20 detects the figure, this means that the camera 20 is facing the optical device 12; the optical device 12 is diffusing the light emitted by the light source 30 to the camera 20. The control member deduces from this that the movable shutter 10 is in its rest position.

The control member can then alert the user, for example by means of a sound and/or light signal, that they need to move the movable shutter 10.

Once the user has moved the movable shutter 10 into its working position, the camera 20 is normally no longer able to detect the figure because it is no longer facing the optical device 12, its field of view now being unobstructed. The control member of the electronic apparatus 1 then forces the light source 30 to emit a continuous light signal in order to restore the nominal situation (if this is not already the case).

If the camera 20 does not detect a figure, this means that the camera 20 is not facing the optical device 12 and that its field of view is therefore unobstructed. The control member deduces from this that the movable shutter 10 is in its working position. The control member can then alert the user, for example by means of a sound and/or light signal, that they need to improve the lighting in their environment. Since the movable shutter 10 is in its working position, the control member of the electronic apparatus 1 forces the light source 30 to emit a continuous light signal (if this is not already the case).

By way of example, the control member detects the figure by analysing the images transmitted by the camera 20. For example, the control member executes an algorithm for comparing images (from among the images generated by the camera and a reference image of the figure) with an acceptance threshold.

It goes without saying that the invention is not limited to the described embodiment but covers any variant falling under the scope of the invention as defined by the claims.

In particular, the electronic apparatus 1 is a set-top box in this case, but the invention can also be integrated in a computer, a television and any other electronic apparatus that includes an image capture device (set-top box, video soundbox, etc.).

In particular, the casing 100 may be a cube, a parallelepiped, a cylinder, a prism or any other shape that allows the present invention to be incorporated.

The optical device 12 and the movable shutter 10 may be two separate pieces that are fastened together.

Although the electronic apparatus comprises a single light source in this case, the electronic apparatus could comprise two distinct light sources. For example, one of the sources could be used for showing the user the activation state of the image capture device, and the other source could be used for detecting whether the movable shutter is in the working or rest position.

Although the figure is borne by a label in this case, the figure could also be borne directly by the optical device, for example by being printed, glued, screen-printed, engraved, etc. directly on the optical device.

The described optical device could be arranged entirely inside the casing. In this case, the electronic apparatus would preferably comprise at least one additional optical device for guiding the light from at least one source (the activation of which would be synchronised with that of the image capture device), the additional optical device comprising a portion extending outside the casing so that the user can detect whether the image capture device is on or off.

At least one portion of the optical device could be made of a material other than that stated. Said portion could thus be made of or based on polycarbonate and/or polypropylene and/or PMMA, etc. tinted with titanium dioxide, with fillers, for example made of plastics material, etc.

An optical device that is at least partially transparent could also be envisaged. However, it is preferable for at least one portion of said optical device to be translucent.

The invention claimed is:

1. An electronic apparatus comprising:
   a casing provided with a first opening,
   an image capture device having a field of view,
   a movable shutter provided with an opening, said shutter being mounted on the casing so as to be movable between a working position and a rest position so that when the movable shutter is in its working position, the image capture device can, during operation, see the exterior of the casing via the first opening and the opening in the movable shutter, and when the shutter is in its rest position, the movable shutter blocks the first opening for the image capture device, and
   a light source;
   wherein said movable shutter comprises an optical device arranged to guide the light, and in that when the movable shutter is in its rest position, the optical device is arranged to guide the light from the light source to the field of view of the image capture device.

2. The electronic apparatus according to claim 1, wherein the optical device is arranged on the movable shutter so as to extend with respect to the image capture device and said light source when the movable shutter is in its rest position.

3. The electronic apparatus according to claim 1, wherein the optical device of said movable shutter extends as far as the exterior of said casing.

4. The electronic apparatus according to claim 1, wherein the image capture device and said light source are fastened to an electronic card of the electronic apparatus, wherein the assembly formed by the electronic card, the image capture device and the light source is fixed in place relative to the casing.

5. The electronic apparatus according to claim 1, wherein the optical device of the movable shutter comprises at least one translucent portion.

6. The electronic apparatus according to claim 1, wherein the optical device and said movable shutter are formed as a single piece.

7. The electronic apparatus according to claim 1, wherein said light source is capable of emitting a blinking that is detectable by the image capture device when the movable shutter is in its rest position.

8. The electronic apparatus according to claim 7, wherein the blinking has a complex sequence.

9. The electronic apparatus according to claim 1, wherein the optical device of said movable shutter comprises a figure positioned facing the field of view of the image capture device when the movable shutter is in its rest position.

10. The electronic apparatus according to claim 1, wherein the electronic apparatus is a set-top box.

\* \* \* \* \*